United States Patent
Yurchenko et al.

(10) Patent No.: US 9,710,532 B2
(45) Date of Patent: Jul. 18, 2017

(54) METHOD FOR AVOIDING CONFLICTS IN DATABASE CLUSTER

(71) Applicant: Codership Oy, Helsinki (FI)

(72) Inventors: Alexey Yurchenko, Espoo (FI); Seppo Jaakola, Helsinki (FI); Teemu Ollakka, Oulu (FI)

(73) Assignee: Codership Oy, Helsinki (FI)

( * ) Notice: Subject to any disclaimer, the term of this patent is extended or adjusted under 35 U.S.C. 154(b) by 547 days.

(21) Appl. No.: 14/465,403

(22) Filed: Aug. 21, 2014

(65) Prior Publication Data

US 2016/0055230 A1    Feb. 25, 2016

(51) Int. Cl.
 *G06F 17/30* (2006.01)

(52) U.S. Cl.
 CPC .................. *G06F 17/30575* (2013.01)

(58) Field of Classification Search
 None
 See application file for complete search history.

(56) References Cited

U.S. PATENT DOCUMENTS

| | | | | |
|---|---|---|---|---|
| 5,590,321 A * | 12/1996 | Lin | ................... | G06F 17/30463 |
| 6,289,334 B1 * | 9/2001 | Reiner | ............... | G06F 17/30445 |
| 8,719,225 B1 * | 5/2014 | Rath | ................. | G06F 17/30578 |
| | | | | 707/634 |
| 8,914,340 B2 * | 12/2014 | Ash | ....................... | G06F 3/0611 |
| | | | | 707/694 |
| 9,122,741 B1 * | 9/2015 | McAlister | ......... | G06F 17/30595 |
| 9,471,657 B1 * | 10/2016 | Xiao | .................. | G06F 17/30575 |
| 9,489,443 B1 * | 11/2016 | Muniswamy-Reddy | ............... | G06F 17/30575 |
| 2006/0004858 A1 | 1/2006 | Tran et al. | | |
| 2006/0031450 A1 | 2/2006 | Unrau et al. | | |
| 2009/0037507 A1 | 2/2009 | Rosman et al. | | |
| 2010/0094851 A1 * | 4/2010 | Bent | ................. | G06F 17/30339 |
| | | | | 707/706 |
| 2010/0235394 A1 * | 9/2010 | Sukanen | ........... | G06F 17/30241 |
| | | | | 707/782 |
| 2011/0302242 A1 | 12/2011 | Kim et al. | | |
| 2014/0044015 A1 | 2/2014 | Chen et al. | | |
| 2014/0348087 A1 | 11/2014 | Wu et al. | | |

OTHER PUBLICATIONS

Wu et al., Load Balancing and Hot Spot Relief for Hash Routing among a Collection of Proxy Caches, Distributed Computing Systems, 1999. Proceedings. 19th IEEE International Conference on Distributed Computing Systems, retrieved from the Internet, <URL: http://ieeexplore.ieee.org/stamp/stamp.jsp?tp=&arnumber=776556>.*

Wei et al., Hot-Spot Based Composition Algorithm, 1992, Eighth International Conference on Data Engineering, retrieved from the Internet, <URL: http://ieeexplore.ieee.org/stamp/stamp.jsp?arnumber=213206>.*

* cited by examiner

*Primary Examiner* — Tyler Torgrimson (74) *Attorney, Agent, or Firm* — Ziegler IP Law Group, LLC (57) ABSTRACT

A method for avoiding conflicts in a multi-master database cluster is provided. A set of hot spots is identified in the database cluster. When a given node receives a given transaction, the given node selects one or more hot-spot servicing nodes for one or more hot-spot sub-transactions, namely one or more sub-transactions of the given transaction that correspond to one or more hot spots of the set of hot spots. Subsequently, the given node redirects the hot-spot sub-transactions to their respective hot-spot servicing nodes. The hot-spot sub-transactions are then executed at their respective hot-spot servicing nodes.

20 Claims, 8 Drawing Sheets

METHOD FOR AVOIDING CONFLICTS IN DATABASE CLUSTER

TECHNICAL FIELD

The present disclosure generally relates to data synchronization, and more specifically, to methods for avoiding conflicts in a database cluster. Moreover, the present disclosure relates to computer program products including non-transitory machine-readable data storage media having stored thereon program instructions that, when accessed by processing devices, cause the processing devices to perform the aforesaid methods.

BACKGROUND

A multi-master database cluster, which does not employ distributed locking to protect data access, has to detect and resolve write conflicts of transactions at a later time, eventually before the transactions are committed. Such database clusters typically employ Optimistic Concurrency Control (OCC) for data replication and synchronization purposes, and sort out write conflicts usually by rolling back transactions.

A conflict may arise when two or more transactions perform a write access to a same database object through separate database servers substantially concurrently. The phrase "substantially concurrently" may be defined as a situation where a first transaction is executed at a first database server and a second transaction is executed at a second database server, and the timing of both the executions is such that the first database server does not have knowledge of the second transaction and/or the second database server does not have knowledge of the first transaction.

In order to resolve the conflict, the database cluster needs to abort and roll back all but one of the two or more transactions. Such rolling back of transactions affects an overall transaction processing performance of the database cluster. Moreover, roll-backs are a waste of efforts, as rolled back transactions have to be processed again at a later time.

Moreover, in a situation where a database schema of the database cluster includes a particular database table to which several transactions need to write frequently, that particular database table is referred as a hot-spot in the database schema. Such hot-spots often lead to frequent occurrence of conflicts in the database cluster. If hot-spots are too pronounced, the overall transaction processing performance of the database cluster can be seriously degraded.

Moreover, for some applications, avoiding conflicts may be a necessary requirement, if these applications are unable to handle an unexpected abortion of database transactions in a logical manner.

SUMMARY

The present disclosure seeks to provide a method for avoiding conflicts in a multi-master database cluster.

In one aspect, embodiments of the present disclosure provide a method for avoiding conflicts in a multi-master database cluster. The database cluster includes a plurality of nodes. The nodes are coupled in communication, and are operable to exchange data amongst themselves.

A collection of hot-spot policies is predetermined in the database cluster. Optionally, the collection of hot-spot policies defines one or more criteria for determining hot spots within the database cluster. Optionally, a database object, such as a database table, satisfying the criteria is identified as a hot spot. In this regard, database tables that are modified most frequently in the database cluster are identified as hot spots. Using the criteria, a set of hot spots is identified in the database cluster. It is to be noted here that the set of hot spots is not limited to database tables only, and could include any identifiable range of data elements.

Optionally, the collection of hot-spot policies is updated based on write conflict statistics accumulated during a predefined time period. More optionally, the collection of hot-spot policies is updated based on write conflict statistics accumulated throughout a lifetime of the database cluster.

When a given node processes one or more database queries, which are usually Structured Query Language (SQL) statements, as a part of a transaction, the given node determines whether or not one or more such data elements are modified, which correspond to one or more hot spots of the set of hot spots identified earlier. The given node then selects, from the plurality of nodes, one or more hot-spot servicing nodes and redirects the one or more database queries to their respective hot-spot servicing nodes to be processed as sub-transactions therein, namely data modifications for each of the one or more hot spots to be processed as sub-transactions in the respective hot-spot servicing node. Such sub-transactions are hereinafter referred to as "hot-spot sub-transactions". The hot-spot sub-transactions are then executed at their respective hot-spot servicing nodes.

Beneficially, the hot-spot servicing nodes are selected deterministically. This implies that different transactions, received at different nodes of the database cluster, corresponding to a same hot spot will be redirected to a same hot-spot servicing node. As an example, when two or more transactions, received substantially concurrently at different nodes of the database cluster (hereinafter referred to as "concurrent transactions"), correspond to a same hot spot, these concurrent transactions are redirected by their respective nodes to a same hot-spot servicing node. This potentially prevents occurrence of conflicts in the database cluster, as will be elucidated in greater detail later.

Optionally, the hot-spot servicing nodes are selected based on a redirection rule defined in the collection of hot-spot policies.

In one embodiment, the redirection rule employs an ordered list of nodes for selecting the hot-spot servicing nodes.

In another embodiment, the redirection rule employs a hash function, which is applied to one or more hot-spot identifiers that are assigned to the hot spots, for selecting the hot-spot servicing nodes. For this purpose, each hot spot of the set of hot spots is assigned a hot-spot identifier uniquely.

Moreover, when the given transaction includes one or more sub-transactions that do not correspond to any hot spot of the set of hot spots (hereinafter referred as "non-hot-spot sub-transactions"), the given node optionally splits the given transaction into the hot-spot sub-transactions and the non-hot-spot sub-transactions, before redirecting the hot-spot sub-transactions to the respective hot-spot servicing nodes. Optionally, these non-hot-spot sub-transactions are executed at the given node. In this manner, the given transaction is processed as a distributed transaction in the database cluster.

Optionally, the given transaction is processed in the database cluster as per the eXtended Architecture (XA) standard specified by The Open Group for Distributed Transaction Processing (DTP), or a similar DTP protocol. Accordingly, the given transaction is committed, when each sub-transaction of the given transaction completes successfully. The given transaction is rolled back, when one or more sub-transactions of the given transaction fail.

In another aspect, embodiments of the present disclosure provide a computing apparatus including a processor, a memory coupled to the processor, and a network interface coupled to the processor, wherein the processor is configured to perform the aforementioned method.

In yet another aspect, embodiments of the present disclosure provide a computer program product including a non-transitory machine-readable data storage medium having stored thereon program instructions that, when accessed by a processing device, cause the processing device to perform the aforementioned method.

Embodiments of the present disclosure substantially eliminate or at least partially address the aforementioned problems in the prior art, and avoid conflicts during synchronization of data within a database cluster.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Glossary

Brief definitions of terms used throughout the present disclosure are given below.

The term "database" generally refers to an organized collection of machine-readable data.

The term "Database Management System (DBMS)" generally refers to a software application specially designed to manage and manipulate resources in a database. The DBMS provides an interface, such as an Application Programming Interface (API) or a Structured Query Language (SQL) for performing basic database operations, such as create, read, update, and delete (often referred to as CRUD).

The term "database cluster" generally refers to a plurality of database servers or nodes, wherein each database server or node includes a DBMS. Each node resides in its own process space and may reside on the same server or different servers. Each node maintains a copy of a portion or all of resources from other nodes within the database cluster. The nodes are configured to communicate with other nodes, in order to synchronize the resources such that all copies of a particular resource contain the same data.

The terms "modify" and "modified" generally refer to any type of change to a resource including create, delete or update operations.

The term "update" generally refers to a change to data in a resource.

The term "transaction" generally refers to a set of one or more data operations that are grouped together, such that either all of these operations execute and have their corresponding results committed, or none of these results are committed. A transaction is typically executed in two phases. In a first phase, all operations in the transaction are executed, and the results are saved in a temporary storage. In a second phase, the results are written to databases within a database cluster. The second phase of writing the results to the databases is often referred to as committing the transaction. After the first phase is completed, a determination can be made as to whether it is desired to commit the transaction. In case of a conflict of synchronization, the transaction is rolled back, i.e., the temporary results are discarded and the databases are not modified.

The term "hot spot" generally refers to a database object, such as a database table, to which several transactions need to write frequently.

The term "client" generally refers to an application, program, process or device in a client/server relationship that requests information or services from another program, process or device (a server) on a communication network. Importantly, the terms "client" and "server" are relative since an application may be a client to one application but a server to another. The term "client" also encompasses software that makes the connection between a requesting application, program, process or device to a server possible, such as an FTP client.

The term "server" generally refers to an application, program, process or device in a client/server relationship that responds to requests for information or services by another program, process or device (a server) on a communication network. The term "server" also encompasses software that makes the act of serving information or providing services possible.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the present disclosure provided herein, one of ordinary skill in the art will appreciate a variety of ways in which connection or coupling exists in accordance with the aforementioned definition.

The phrases "in an embodiment," "in accordance with an embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

Figure 1:
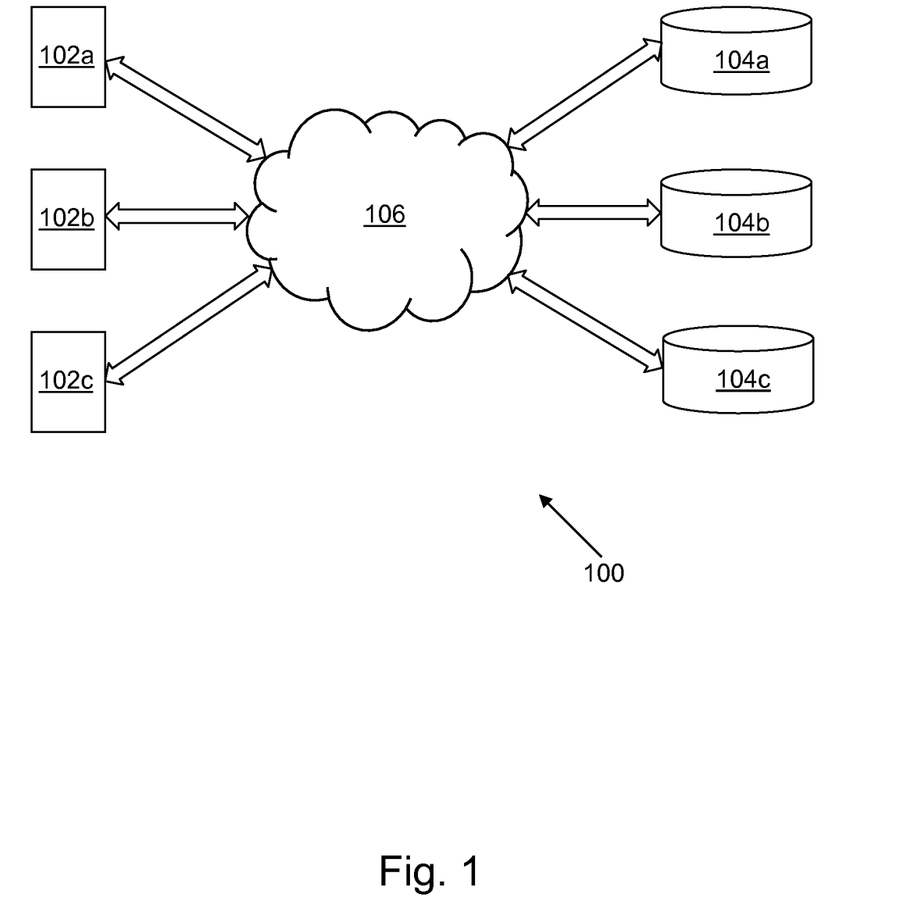
FIG. 1 is a schematic illustration of an example network environment in which a multi-master database cluster is implemented pursuant to the present disclosure.

Referring now to the drawings, particularly by their reference numbers, FIG. 1 is a schematic illustration of an example network environment 100 in which a multi-master database cluster is implemented pursuant to the present disclosure. The network environment 100 includes one or more clients, depicted as a client 102a, a client 102b and a client 102c (hereinafter collectively referred to as clients 102). Additionally, the network environment 100 includes a plurality of nodes, depicted as a node 104a, a node 104b and a node 104c (hereinafter collectively referred to as nodes 104). The nodes 104 form the multi-master database cluster.

The nodes 104 may, for example, be database servers, processes associated with databases, or computing devices dedicated to running such processes. The nodes 104 may be installed at separate hardware or at same hardware. In an example, the nodes 104 are optionally distributed geographically. In another example, the nodes 104 are optionally implemented as a cloud service.

Further, the network environment 100 also includes one or more communication networks, depicted as a communication network 106. Optionally, the communication network 106 couples some or all of the nodes 104 in communication for exchanging data amongst the nodes 104.

Additionally or alternatively, some of the nodes 104 are coupled in communication via another communication network that is isolated from the communication network 106.

Additionally or alternatively, some of the nodes 104 are coupled in communication via non-network means, for example, such as Unix domain sockets.

The communication network 106 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The communication network 106 also provides a communication medium between the clients 102 and the nodes 104. Consequently, the clients 102 are operable to access the nodes 104 via the communication network 106. In some examples, the clients 102 are web services that allow users to access the nodes 104. Accordingly, the clients 102 are optionally operable to perform read and/or write operations on the nodes 104.

A collection of hot-spot policies is predetermined in the database cluster. Optionally, the collection of hot-spot policies defines one or more criteria for determining hot spots within the database cluster. Optionally, a database object, such as a database table, satisfying the criteria is identified as a hot spot. In this regard, database tables that are modified most frequently in the database cluster are identified as hot spots. Using the criteria, a set of hot spots is identified in the database cluster. It is to be noted here that the set of hot spots is not limited to database tables only, and could include any identifiable range of data elements.

Optionally, the collection of hot-spot policies is updated based on write conflict statistics accumulated during a predefined time period. The predefined time period could be defined by a system administrator of the database cluster. The predefined time period may, for example, be last week, last two weeks, last month, last three months, last six months, last year, or the like. More optionally, the collection of hot-spot policies is updated based on write conflict statistics accumulated throughout a lifetime of the database cluster.

When a given node of the nodes 104 processes one or more database queries as a part of a transaction, the given node determines whether or not one or more such data elements are modified, which correspond to one or more hot spots of the set of hot spots identified earlier. The given node then selects, from the nodes 104, one or more hot-spot servicing nodes and redirects the one or more database queries to their respective hot-spot servicing nodes to be processed as sub-transactions therein, namely data modifications for each of the one or more hot spots to be processed as sub-transactions in the respective hot-spot servicing node. Such sub-transactions are hereinafter referred to as "hot-spot sub-transactions". The hot-spot sub-transactions are then executed at their respective hot-spot servicing nodes.

Optionally, the given node redirects the hot-spot sub-transactions soon after the given node has parsed the given transaction and has identified the hot spots to which these hot-spot sub-transactions correspond. In an example, the given node redirects the hot-spot sub-transactions soon after the given node has parsed SQL statements of the given transaction and has identified corresponding hot spots. However, such SQL-level redirecting is suitable only for single statement transactions, namely transactions in an "autocommit" mode. For multi-statement transactions, it is desired that reads from hot spots and/or joins with hot spots, namely table joins involving hot spot tables and non-hot spot tables, are also redirected to their respective hot-spot servicing nodes.

As an alternative to the SQL-level redirecting, when a DBMS of the given node has a remote database support at a data manager level, such as MySQL FederatedX engine, the given node further processes the SQL statements, and redirects the hot-spot sub-transactions via a remote data manager interface. In such a case, a remote data manager supporting multi-statement transactions redirects reads, writes and/or joins of hot spots to their respective hot-spot servicing nodes.

Moreover, when the given transaction includes one or more sub-transactions that do not correspond to any hot spot of the set of hot spots (hereinafter referred as "non-hot-spot sub-transactions"), the given node optionally splits the given transaction into the hot-spot sub-transactions and the non-hot-spot sub-transactions, before redirecting the hot-spot sub-transactions to the respective hot-spot servicing nodes. Optionally, these non-hot-spot sub-transactions are executed at the given node. In this manner, the given transaction is processed as a distributed transaction in the database cluster.

In order to process a distributed transaction reliably in the database cluster, the distributed transaction should honor Atomicity, Consistency, Isolation, Durability (ACID) properties. Optionally, the given transaction is processed in the database cluster as per the eXtended Architecture (XA) standard specified by The Open Group for Distributed Transaction Processing (DTP), or a similar DTP protocol. Accordingly, the given transaction is committed, when each sub-transaction of the given transaction completes successfully, namely when all sub-transactions can commit. The given transaction is rolled back, when one or more sub-transactions of the given transaction fail.

Moreover, distributed processing of a global transaction can result in a distributed deadlock, where two or more transactions have resources locked in one or more hot-spot servicing nodes and/or other nodes of the database cluster. A functional implementation of a multi-master conflict prevention algorithm requires that such distributed deadlocks are resolved. There are several methods for resolving such distributed deadlocks, one of which is a Commitment Ordering (CO) method, as described in "The Principle of Commitment Ordering", a paper by Yoav Raz (1992) at Proceedings of the 18th Very Large Data Bases (VLDB) Conference Vancouver, British Columbia, Canada (http://www.vldb.org/conf/1992/P292.PDF) The paper is incorporated herein by reference in its entirety.

FIG. 1 is merely an example, which should not unduly limit the scope of the claims herein. It is to be understood that the implementation of the network environment 100 is provided as an example and is not limited to a specific type or number of nodes, clients and communication networks. A person skilled in the art will recognize many variations, alternatives, and modifications of embodiments of the present disclosure.

Figure 2A:
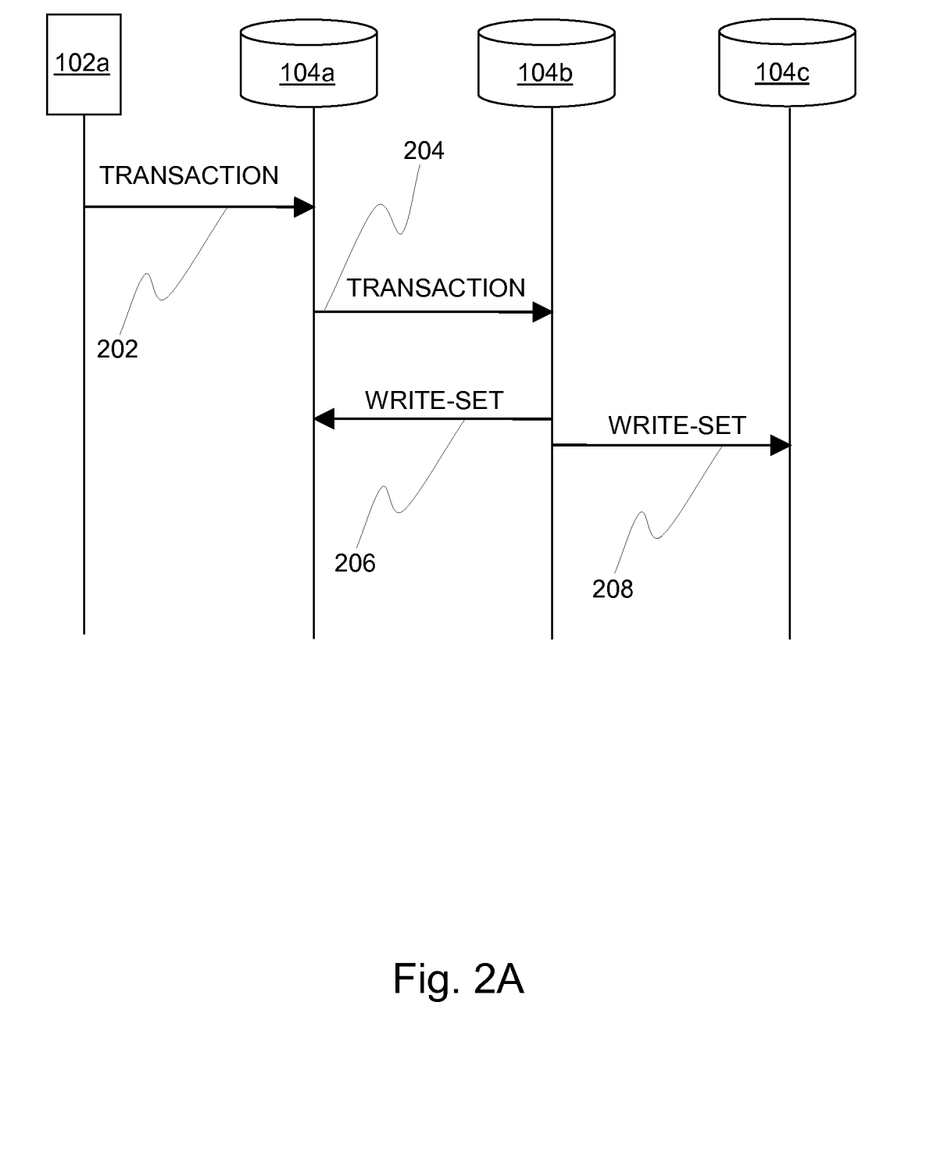
FIGS. 2A, 2B and 2C are illustrations of example data flows for a given transaction, in accordance with an embodiment of the present disclosure.
Figure 2B:
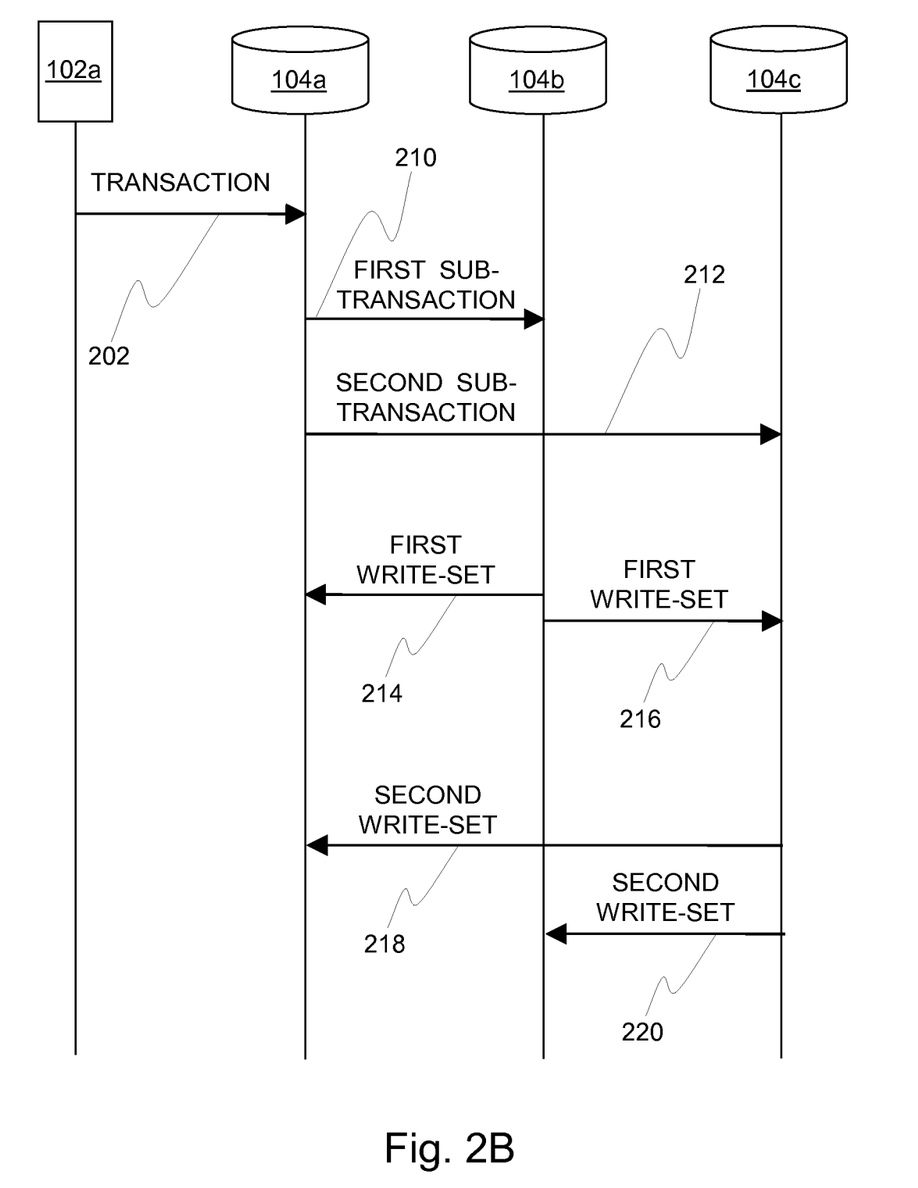
Figure 2C:
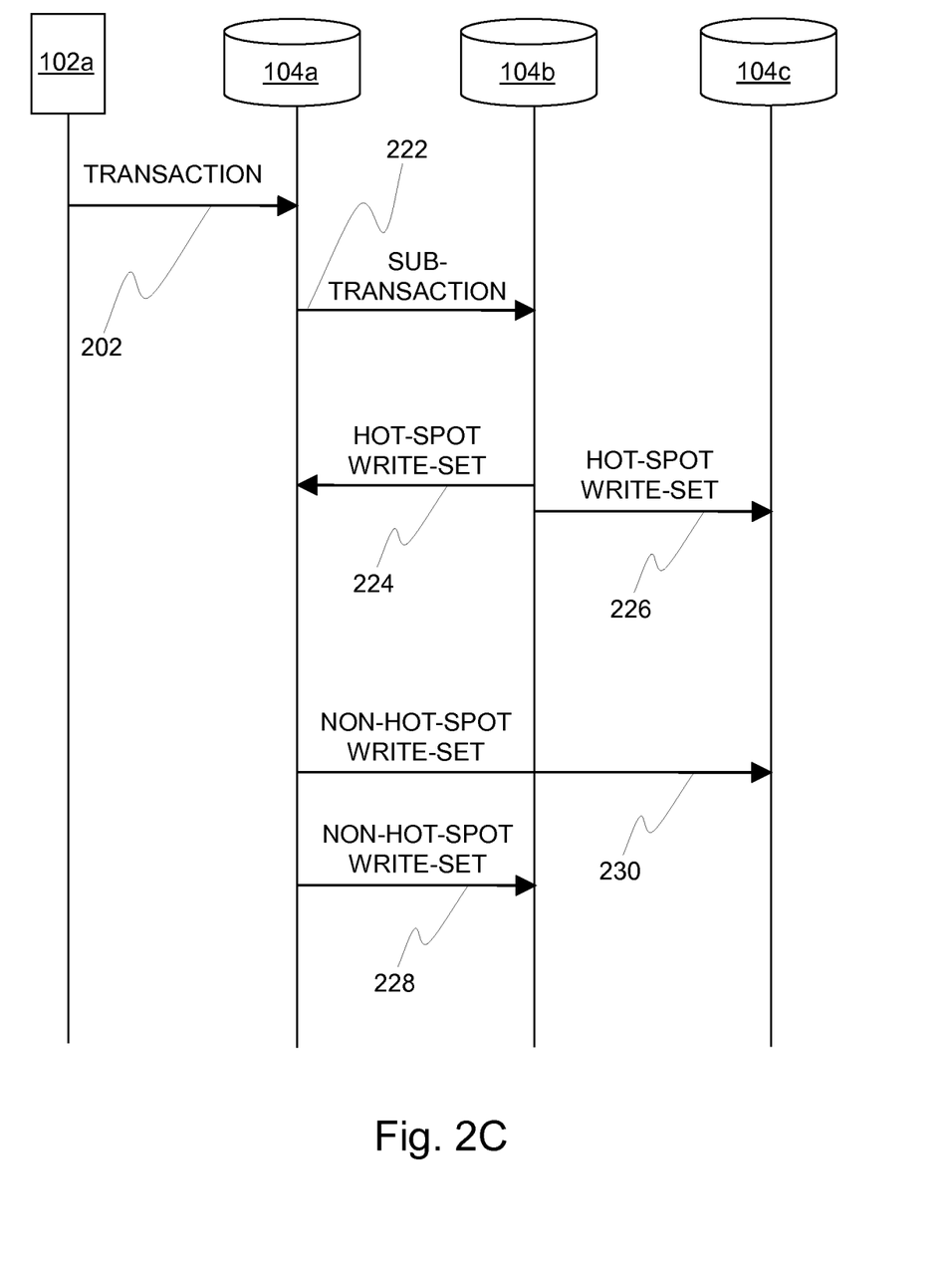

FIGS. 2A, 2B and 2C are illustrations of example data flows for a given transaction, in accordance with an embodiment of the present disclosure. For illustration purposes, an example will be described, wherein the client 102a opens a connection to the node 104a. It is to be noted that the clients 102 can open connection to any of the nodes 104. A node where a client is connected operates as a master node for that connection, while other nodes operate as slave nodes for the connection. In the example herein, the node 104a operates as a master node for the given transaction, while the nodes 104b and 104c operate as slave nodes for the given transaction.

The client 102a sends data pertaining to the given transaction to the node 104a, as depicted by a data flow arrow 202. Upon receiving the data, the node 104a determines whether or not one or more sub-transactions of the given transaction correspond to one or more hot spots of the set of hot spots.

If it is determined that one or more sub-transactions of the given transaction correspond to one or more hot spots of the set of hot spots, the node 104a identifies these sub-transactions as hot-spot sub-transactions. The node 104a then selects, from the nodes 104, one or more hot-spot servicing nodes for these hot-spot sub-transactions. Various example situations pertaining to selection of hot-spot servicing nodes have been described in conjunction with FIGS. 2A-C.

On the other hand, if it is determined that the given transaction and/or its sub-transactions do not correspond to any hot spot of the set of hot spots, the node 104a identifies the sub-transactions of the given transaction as non-hot-spot sub-transactions. Accordingly, the node 104a executes these non-hot-spot sub-transactions at its database. In that case, the node 104a communicates a write-set pertaining to the given transaction to the nodes 104b and 104c.

FIG. 2A is an illustration of an example data flow with respect to a first example situation in which the node 104a selects a single hot-spot servicing node. The first example situation pertains to:

(i) a case where the given transaction is a single statement transaction, namely a transaction including only one sub-transaction, that accesses one or more hot spots, wherein each of these hot spots is served in a same hot-spot servicing node; or (ii) a case where the given transaction is a multi-statement transaction, whose sub-transactions access one or more hot spots, wherein each of these hot spots is served in a same hot-spot servicing node.

For illustration purposes, an example will be described where the node 104a selects the node 104b as a hot-spot servicing node. With reference to FIG. 2A, the node 104a redirects the hot-spot sub-transactions of the given transaction to the node 104b, as depicted by a data flow arrow 204. The node 104b then executes the hot-spot sub-transactions within its database.

In order to synchronize the given transaction with the nodes 104a and 104c, the node 104b communicates a write-set pertaining to the given transaction to the nodes 104a and 104c, as depicted by data flow arrows 206 and 208, respectively.

Furthermore, upon receiving the write-set from the node 104b, the nodes 104a and 104c execute the given transaction within their respective databases, and commit the given transaction. Consequently, the node 104b also commits the given transaction.

FIG. 2B is an illustration of an example data flow with respect to a second example situation in which the node 104a selects more than one hot-spot servicing node. The second example situation pertains to a case where the given transaction is a multi-statement transaction, whose sub-transactions access different hot spots served in different hot-spot servicing nodes.

For illustration purposes, an example will be described where the given transaction includes a first hot-spot sub-transaction and a second hot-spot sub-transaction. In the example, the node 104a selects the nodes 104b and 104c as hot-spot servicing nodes for the first and second hot-spot sub-transactions, respectively. With reference to FIG. 2B, the node 104a redirects the first and second hot-spot sub-transactions to the nodes 104b and 104c, as depicted by data flow arrows 210 and 212, respectively. Subsequently, the node 104b executes the first hot-spot sub-transaction within its database, while the node 104c executes the second hot-spot sub-transaction within its database.

In order to synchronize the given transaction in the database cluster, the node 104b communicates a first write-set pertaining to the first hot-spot sub-transaction to the nodes 104a and 104c, as depicted by data flow arrows 214 and 216, respectively. Likewise, the node 104c communicates a second write-set pertaining to the second hot-spot sub-transaction to the nodes 104a and 104b, as depicted by data flow arrows 218 and 220, respectively.

Furthermore, upon receiving the first write-set from the node 104b, the nodes 104a and 104c execute the first hot-spot sub-transaction within their respective databases. Likewise, upon receiving the second write-set from the node 104c, the nodes 104a and 104b execute the second hot-spot sub-transaction within their respective databases. When both the first and second hot-spot sub-transactions complete successfully, the given transaction is committed.

FIG. 2C is an illustration of an example data flow with respect to a third example situation in which the given transaction is a multi-statement transaction, which includes one or more hot-spot sub-transactions and one or more non-hot-spot sub-transactions.

For illustration purposes, an example will be described where the given transaction includes a hot-spot sub-transaction and a non-hot-spot sub-transaction. In the example, the node 104a splits the given transaction into the hot-spot sub-transaction and the non-hot-spot sub-transaction, and selects the node 104b as a hot-spot servicing node for the hot-spot sub-transaction. With reference to FIG. 2C, the node 104a redirects the hot-spot sub-transaction to the node 104b, as depicted by a data flow arrow 222. Subsequently, the node 104b executes the hot-spot sub-transaction within its database, while the node 104a executes the non-hot-spot sub-transaction within its database.

In order to synchronize the given transaction in the database cluster, the node 104b communicates a hot-spot write-set pertaining to the hot-spot sub-transaction to the nodes 104a and 104c, as depicted by data flow arrows 224 and 226, respectively. Likewise, the node 104a communicates a non-hot-spot write-set pertaining to the non-hot-spot sub-transaction to the nodes 104b and 104c, as depicted by data flow arrows 228 and 230, respectively.

Furthermore, upon receiving the hot-spot write-set from the node 104b, the nodes 104a and 104c execute the hot-spot sub-transaction within their respective databases. Likewise, upon receiving the non-hot-spot write-set from the node 104a, the nodes 104b and 104c execute the non-hot-spot sub-transaction within their respective databases. When both the hot-spot and non-hot-spot sub-transactions complete successfully, the given transaction is committed.

It should be noted here that the implementation of the database cluster is not limited to a specific number of nodes. FIGS. 2A-C are merely examples, which should not unduly limit the scope of the claims herein. A person skilled in the art will recognize many variations, alternatives, and modifications of embodiments of the present disclosure.

Figure 3:
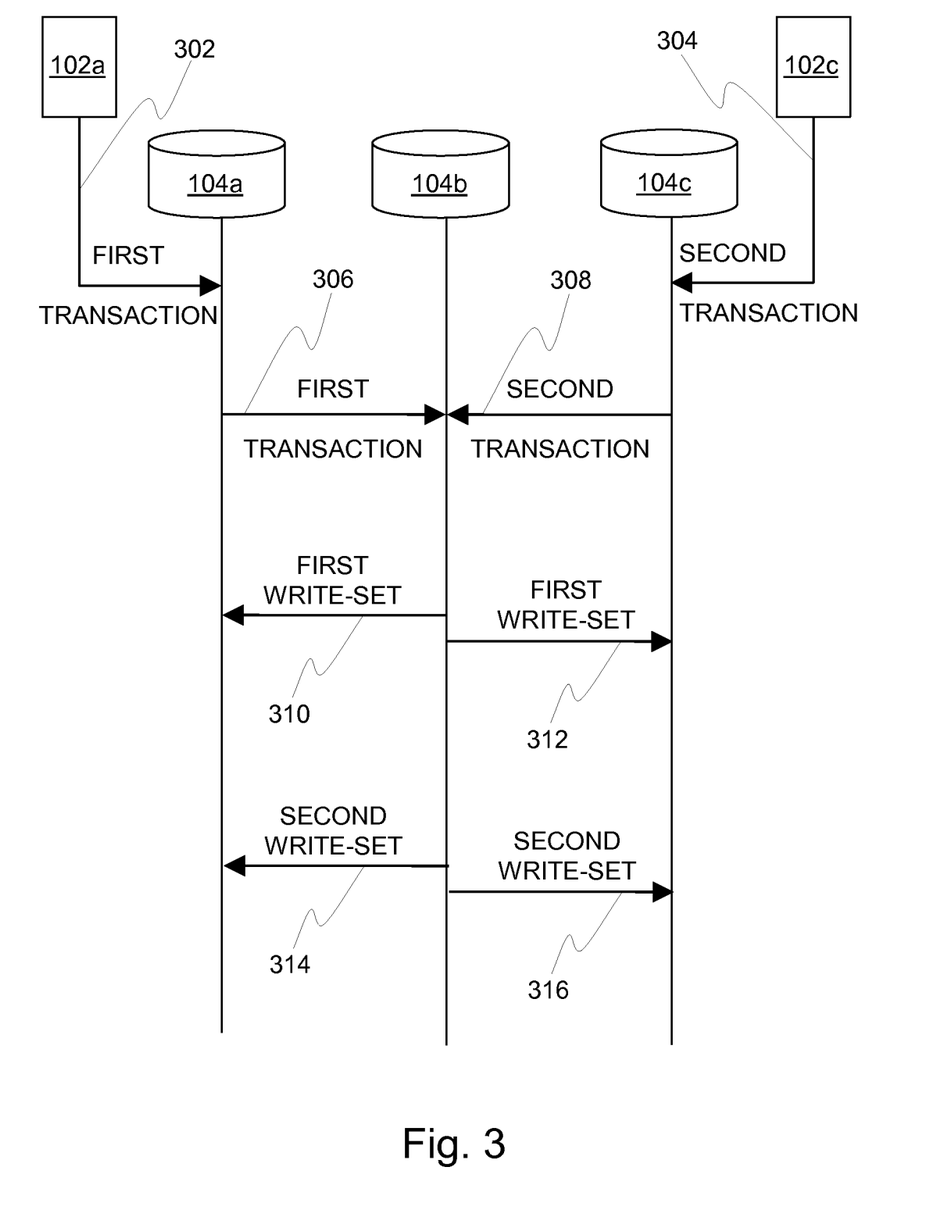
FIG. 3 is an illustration of an example data flow with respect to an example situation in which two or more transactions are executed on different nodes of the database cluster substantially concurrently, in accordance with an embodiment of the present disclosure.

FIG. 3 is an illustration of an example data flow with respect to an example situation in which two or more transactions are executed on different nodes of the database cluster substantially concurrently, in accordance with an embodiment of the present disclosure. For illustration purposes, an example will be described where a first transaction and a second transaction, received substantially concurrently at different nodes of the database cluster, correspond to a same hot spot.

In the example, the nodes 104a and 104c receive the first and second transactions from the clients 102a and 102c, respectively. With reference to FIG. 3, the client 102a sends data pertaining to the first transaction to the node 104a, as depicted by a data flow arrow 302; while the client 102c sends data pertaining to the second transaction to the node 104c, as depicted by a data flow arrow 304.

As both the first and second transactions correspond to the same hot spot, the nodes 104a and 104c select a same hot-spot servicing node deterministically. Details of how the same hot-spot servicing node is selected deterministically have been provided later.

In the example herein, the nodes 104a and 104c select the node 104b as the hot-spot servicing node for the first and second transactions. Consequently, the node 104a redirects the first transaction to the node 104b, as depicted by a data flow arrow 306; while the node 104c redirects the second transaction to the node 104b, as depicted by a data flow arrow 308.

For illustration purposes herein, let us assume that the first transaction is globally ordered before the second transaction within the database cluster. Accordingly, the node 104b executes the first transaction first, and then executes the second transaction within its database. This potentially enables the node 104b to avoid possible conflicts between the first and second transactions.

Moreover, in order to synchronize the first transaction with the nodes 104a and 104c, the node 104b communicates a first write-set pertaining to the first transaction to the nodes 104a and 104c, as depicted by data flow arrows 310 and 312, respectively. Likewise, in order to synchronize the second transaction with the nodes 104a and 104c, the node 104b communicates a second write-set pertaining to the second transaction to the nodes 104a and 104c, as depicted by data flow arrows 314 and 316, respectively.

Furthermore, upon receiving the first write-set from the node 104b, the nodes 104a and 104c execute the first transaction within their respective databases, and commit the first transaction. Likewise, upon receiving the second write-set from the node 104b, the nodes 104a and 104c execute the second transaction within their respective databases, and commit the second transaction. Consequently, the node 104b also commits the first and second transactions.

FIG. 3 is merely an example, which should not unduly limit the scope of the claims herein. A person skilled in the art will recognize many variations, alternatives, and modifications of embodiments of the present disclosure.

In order to select a hot-spot servicing node deterministically, the nodes 104 optionally employ a redirection rule defined in the collection of hot-spot policies.

In one embodiment of the present disclosure, the redirection rule employs an ordered list of nodes. Optionally, the ordered list includes available nodes in the database cluster. Alternatively, optionally, the ordered list includes all nodes in the database cluster. An order of nodes in the ordered list is altered from time to time. In an example, the order of nodes is altered based on knowledge of which nodes served most recent transactions. This is particularly beneficial for purposes of distribution of computational load amongst the nodes 104.

When a given node receives a hot-spot transaction corresponding to a hot spot, the given node selects a node occurring first in the ordered list as a hot-spot servicing node for this hot-spot transaction. It will be appreciated that each node of the nodes 104 has an identical copy of the ordered list, so as to enable a deterministic selection of the hot-spot servicing node at a given time.

In another embodiment of the present disclosure, the redirection rule employs a hash function. For this purpose, each hot spot of the set of hot spots is assigned a unique hot-spot identifier. Additionally, optionally, each node of the database cluster is assigned a unique node identifier.

For each hot spot, the hash function is applied to a unique hot-spot identifier of that hot spot to generate a corresponding hash code. This hash code is then assigned to a node selected from the nodes 104. Optionally, the hash code is assigned to a node selected randomly from the nodes 104. A hash table is then populated with the hash code and a unique node identifier of the node to which this hash code is assigned. It will be appreciated that each node of the nodes 104 has an identical copy of the hash table, so as to enable a deterministic selection of a hot-spot servicing node at a given time.

When a given node receives a hot-spot transaction corresponding to a hot spot, the given node applies the hash function to a hot-spot identifier assigned to the hot spot to generate a corresponding hash code. The given node then looks up for this hash code in the hash table, to select a hot-spot servicing node for the hot-spot transaction.

As a result of a deterministic selection of a hot-spot servicing node, two or more concurrent transactions, received at different nodes of the database cluster and corresponding to a same hot spot, are redirected by their respective master nodes to a same hot-spot servicing node. Consequently, these concurrent transactions process on the same hot-spot servicing node under a DBMS transaction concurrency control, which serializes their respective access to the same hot spot. This potentially leads to a conflict-free operation of the concurrent transactions in the database cluster.

Moreover, such conflict-free operation of concurrent transactions potentially improves performance of multi-master database clusters that are based on Optimistic Concurrency Control (OCC).

Figure 4:
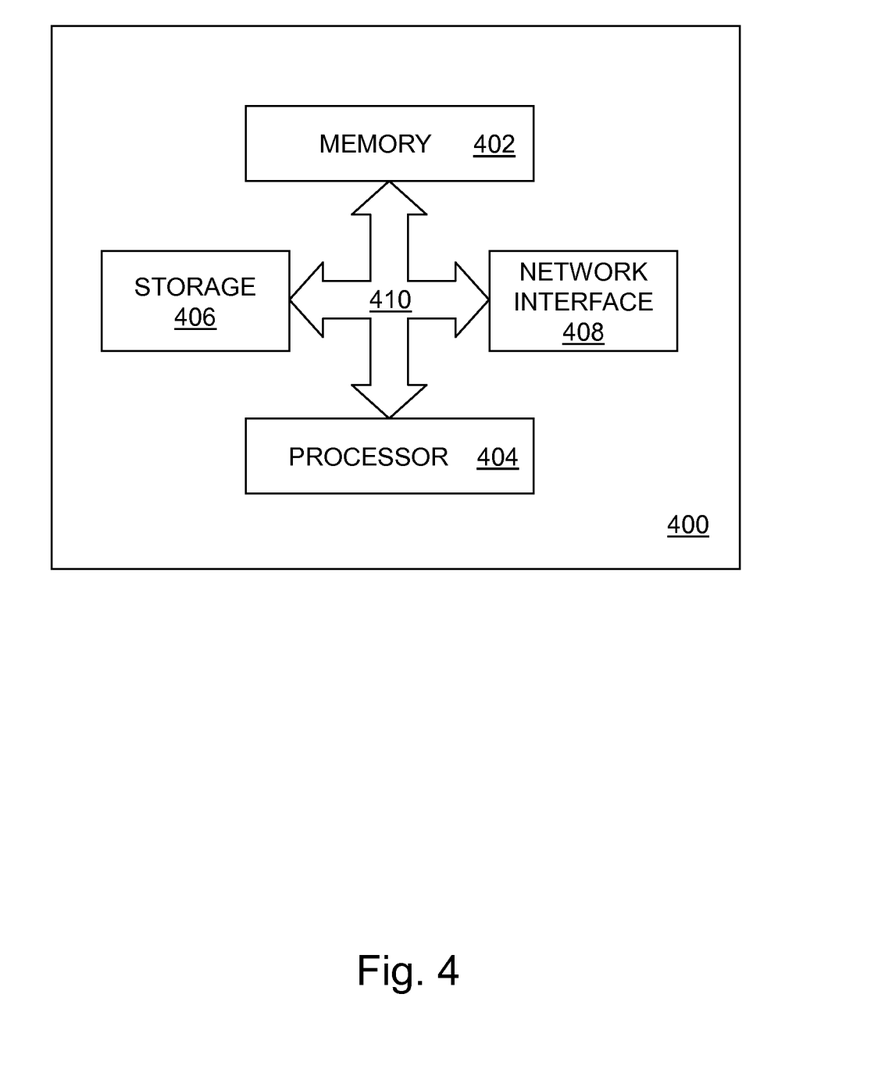
FIG. 4 is a schematic illustration of a computing apparatus for use in a database cluster, in accordance with an embodiment of the present disclosure.

FIG. 4 is a schematic illustration of a computing apparatus 400 for use in a database cluster, in accordance with an embodiment of the present disclosure. The computing apparatus 400 could be implemented in the database cluster in a manner that is similar to the implementation of the nodes 104 as described in conjunction with FIGS. 1, 2A-C and 3. The computing apparatus 400 could be a database server, or a computing device dedicated to running processes associated with databases. Moreover, each of the nodes 104 could be implemented as the computing apparatus 400.

The computing apparatus 400 includes, but is not limited to, a memory 402, a processor 404, a data storage 406, a network interface 408, and a system bus 410 that operatively couples various components including the memory 402, the processor 404, the data storage 406 and the network interface 408.

The computing apparatus 400 also includes a power source (not shown) for supplying electrical power to the various components of the computing apparatus 400. The power source may, for example, include a rechargeable battery.

The memory 402 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data storage 406 is a non-transitory data storage arrangement, for example, including a database.

The network interface 408 optionally allows clients to access the computing apparatus 400, and perform read and/or write operations on the database.

Moreover, the network interface 408 enables the computing apparatus 400 to communicate with other nodes within the database cluster, for example, via a communication network.

Moreover, the processor 404 is configured to perform operations as will be described in conjunction with FIGS. 5A and 5B.

FIG. 4 is merely an example, which should not unduly limit the scope of the claims herein. It is to be understood that the specific designation for the computing apparatus 400 is provided as an example and is not to be construed as limiting the computing apparatus 400 to specific numbers, types, or arrangements of modules and/or components of the computing apparatus 400. A person skilled in the art will recognize many variations, alternatives, and modifications of embodiments of the present disclosure.

Figure 5A:
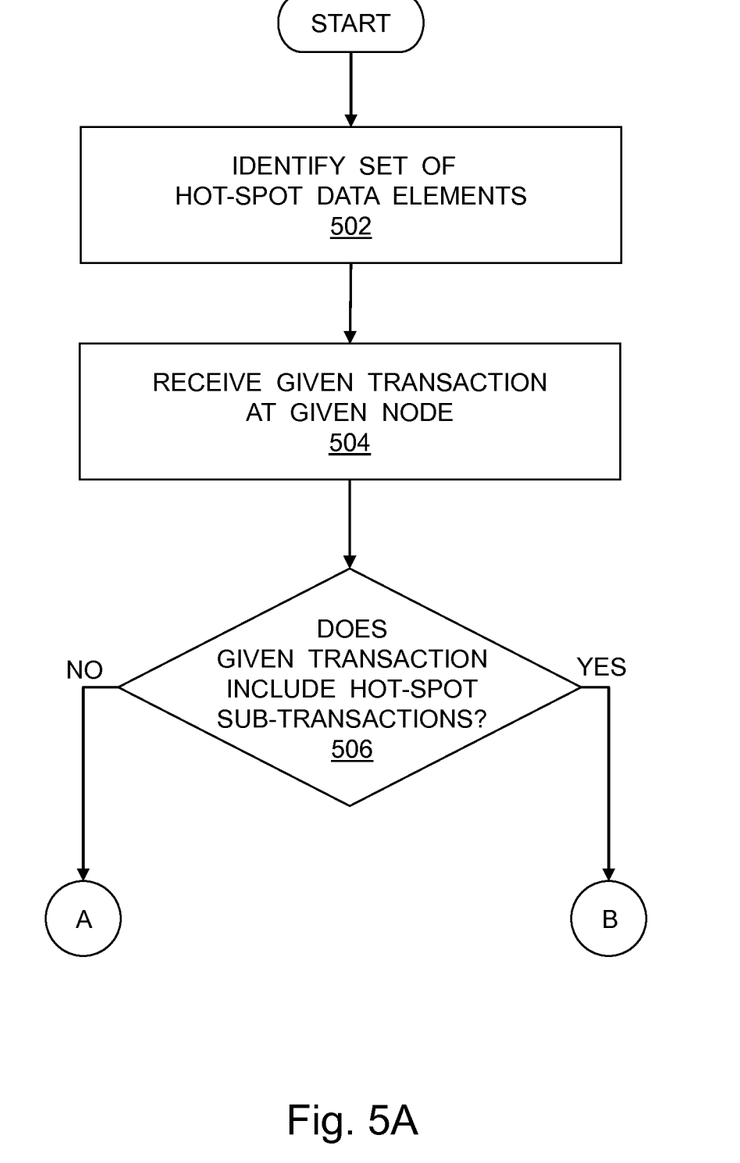
FIGS. 5A and 5B collectively are an illustration of steps of a method for avoiding conflicts in a multi-master database cluster, in accordance with an embodiment of the present disclosure.
Figure 5B:
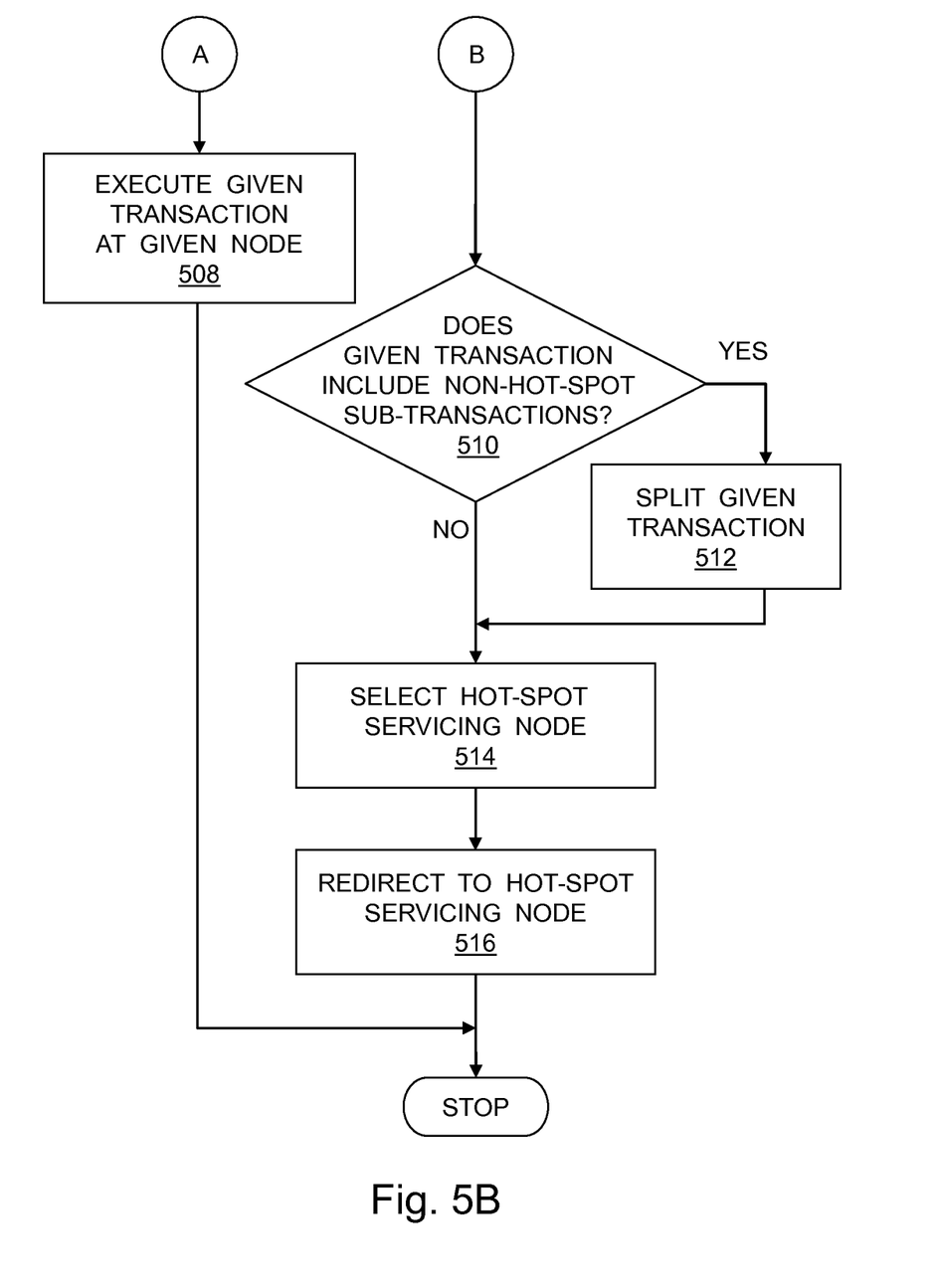

FIGS. 5A and 5B collectively are an illustration of steps of a method for avoiding conflicts in a multi-master database cluster, in accordance with an embodiment of the present disclosure. The method is depicted as a collection of steps in a logical flow diagram, which represents a sequence of steps that can be implemented in hardware, software, or a combination thereof.

The database cluster includes a plurality of nodes. The nodes are coupled in communication, and are operable to exchange data amongst themselves.

At a step 502, a set of hot spots is identified in the database cluster. In accordance with the step 502, a collection of hot-spot policies is predetermined in the database cluster. Database objects satisfying one or more criteria defined in the collection of hot-spot policies are then included in the set of hot spots.

Optionally, the step 502 is performed from time to time to identify database objects that are modified most frequently in the database cluster. As a result, one or more database objects are added to or removed from the set of hot spots, for example, based on most recent write conflicts. As described earlier, the step 502 is performed to update the collection of hot-spot policies based on write conflict statistics accumulated during a predefined time period. The predefined time period may, for example, be last week, last two weeks, last month, last three months, last six months, last year, or the like. More optionally, the step 502 is performed based on write conflict statistics accumulated throughout a lifetime of the database cluster.

At a step 504, a given transaction is received at a given node of the database cluster.

At a step 506, the given node determines whether or not the given transaction includes one or more hot-spot sub-transactions, namely one or more sub-transactions that correspond to one or more hot spots of the set of hot spots.

If, at the step 506, it is determined that the given transaction does not include any hot-spot sub-transaction, a step 508 is performed. At the step 508, the given node executes the given transaction at its database, and communicates a write-set pertaining to the given transaction to other nodes of the database cluster.

Otherwise, if it is determined that the given transaction includes one or more hot-spot sub-transactions, a step 510 is performed. At the step 510, the given node determines whether or not the given transaction includes one or more non-hot-spot sub-transactions, namely one or more sub-transactions that do not correspond to any hot spot of the set of hot spots.

If, at the step 510, it is determined that the given transaction includes one or more non-hot-spot sub-transactions, a step 512 is performed. At the step 512, the given node splits the given transaction into the one or more hot-spot sub-transactions and the one or more non-hot-spot sub-transactions. In accordance with the step 512, the given node executes the non-hot-spot sub-transactions at its database, and communicates a write-set pertaining to the non-hot-spot sub-transactions to other nodes of the database cluster.

After the step 512, a step 514 is performed for the one or more hot-spot sub-transactions of the given transaction.

If, at the step 510, it is determined that the given transaction does not include any non-hot-spot transaction, the step 514 is performed. At the step 514, the given node selects one or more hot-spot servicing nodes for the one or more hot-spot sub-transactions.

Subsequently, at a step 516, the given node redirects the one or more hot-spot sub-transactions to their respective hot-spot servicing nodes. In accordance with the step 516, the one or more hot-spot servicing nodes execute their respective hot-spot sub-transactions, and communicate corresponding write-sets to other nodes of the database cluster.

It should be noted here that the steps 502 to 516 are only illustrative and other alternatives can also be provided where one or more steps are added, one or more steps are removed, or one or more steps are provided in a different sequence without departing from the scope of the claims herein.

Embodiments of the present disclosure provide a computer program product comprising a non-transitory machine-readable data storage medium having stored thereon program instructions that, when accessed by a processing device, cause the processing device to perform operations as described in conjunction with FIGS. 5A-B.

Embodiments of the present disclosure are susceptible to being used for various purposes, including, though not limited to, avoiding conflicts during synchronization of data within a database cluster.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for avoiding conflicts in a multi-master database cluster, wherein the multi-master database cluster comprises a plurality of nodes, the method comprising:
   identifying a set of hot spots in the database cluster, the set of hot spots comprising one or more database objects that satisfy one or more criteria defined in a collection of hot-spot policies;
   receiving, at a given node of the database cluster, a given transaction;
   selecting, from the plurality of nodes, one or more hot-spot servicing nodes for one or more hot-spot sub-transactions of the given transaction, wherein the one or more hot-spot sub-transactions correspond to one or more hot spots of the set of hot spots;
   redirecting the one or more hot-spot sub-transactions to their respective hot-spot servicing nodes; and
   executing the one or more hot-spot sub-transactions at their respective hot-spot servicing nodes.

2. The method of claim 1 further comprising:
   splitting the given transaction into the one or more hot-spot sub-transactions and one or more non-hot-spot sub-transactions, wherein the one or more non-hot-spot sub-transactions do not correspond to the set of hot spots; and
   executing the one or more non-hot-spot sub-transactions at the given node.

3. The method of claim 1 further comprising committing the given transaction, when each sub-transaction of the given transaction completes successfully.

4. The method of claim 1 further comprising rolling back the given transaction, when one or more sub-transactions of the given transaction fail.

5. The method of claim 1, wherein the collection of hot-spot policies is predetermined.

6. The method of claim 1, wherein the collection of hot-spot policies is updated based on write conflict statistics accumulated during a predefined time period.

7. The method of claim 1, wherein the set of hot spots comprise one or more database tables.

8. The method of claim 1, wherein the one or more hot-spot servicing nodes are selected deterministically, based on a redirection rule defined in the collection of hot-spot policies.

9. The method of claim 8, wherein the redirection rule employs an ordered list of nodes.

10. The method of claim 8, wherein each hot spot of the set of hot spots is assigned a hot-spot identifier, and the redirection rule employs a hash function, and wherein the selecting the one or more hot-spot servicing nodes comprises applying the hash function to one or more hot-spot identifiers assigned to the one or more hot spots.

11. A computing apparatus comprising:
   a processor;
   a memory coupled to the processor; and
   a network interface coupled to the processor,
   wherein the processor is configured to:
      identify a set of hot spots in a database cluster, the set of hot spots comprising one or more database objects that satisfy one or more criteria defined in a collection of hot-spot policies;
      receive, at a given node of the database cluster, a given transaction;
      select, from a plurality of nodes of the database cluster, one or more hot-spot servicing nodes for one or more hot-spot sub-transactions of the given transaction, wherein the one or more hot-spot sub-transactions correspond to one or more hot spots of the set of hot spots; and
      redirect the one or more hot-spot sub-transactions to their respective hot-spot servicing nodes.

12. The apparatus of claim 11, wherein the processor is configured to:
   split the given transaction into the one or more hot-spot sub-transactions and one or more non-hot-spot sub-transactions, wherein the one or more non-hot-spot sub-transactions do not correspond to the set of hot spots; and
   execute the one or more non-hot-spot sub-transactions at the given node.

13. The apparatus of claim 11, wherein the processor is configured to commit the given transaction, when each sub-transaction of the given transaction completes successfully.

14. The apparatus of claim 11, wherein the processor is configured to roll back the given transaction, when one or more sub-transactions of the given transaction fail.

15. The apparatus of claim 11, wherein the set of hot spots comprise one or more database tables.

16. The apparatus of claim 11, wherein the one or more hot-spot servicing nodes are selected deterministically, based on a redirection rule defined in the collection of hot-spot policies.

17. The apparatus of claim 16, wherein the redirection rule employs an ordered list of nodes.

18. The apparatus of claim 16, wherein each hot spot of the set of hot spots is assigned a hot-spot identifier, and the redirection rule employs a hash function, and
wherein when selecting the one or more hot-spot servicing nodes, the processor is configured to apply the hash function to one or more hot-spot identifiers assigned to the one or more hot spots.

19. A computer program product comprising a non-transitory machine-readable data storage medium having stored thereon program instructions that, when accessed by a processing device, cause the processing device to:
identify a set of hot spots in a database cluster, the set of hot spots comprising one or more database objects that satisfy one or more criteria defined in a collection of hot-spot policies;
receive, at a given node of the database cluster, a given transaction;
select, from a plurality of nodes of the database cluster, one or more hot-spot servicing nodes for one or more hot-spot sub-transactions of the given transaction, wherein the one or more hot-spot sub-transactions correspond to one or more hot spots of the set of hot spots; and
redirect the one or more hot-spot sub-transactions to their respective hot-spot servicing nodes.

20. The computer program product of claim 19, wherein the one or more hot-spot servicing nodes are selected deterministically, based on a redirection rule defined in the collection of hot-spot policies.

* * * * *